United States Patent [19]
Gustafson et al.

[11] Patent Number: 5,524,134
[45] Date of Patent: Jun. 4, 1996

[54] TELECOMMUNICATIONS SECURITY MODULE

[75] Inventors: David T. Gustafson, Gilbert; Michael A. Savage, Chandler; Paul R. Kennedy, Mesa; Joseph Kish, III, Gilbert; Bruce A. Fette, Mesa, all of Ariz.

[73] Assignee: Motorola, Inc., Schaumburg, Ill.

[21] Appl. No.: 234,793

[22] Filed: Apr. 28, 1994

[51] Int. Cl.$^6$ .................................................. H04M 11/00
[52] U.S. Cl. ........................................... 379/58; 380/9
[58] Field of Search ......................... 379/58, 59, 62; 455/33.1, 54.1; 380/9, 19, 41, 49, 23

[56] References Cited

U.S. PATENT DOCUMENTS 5,249,227  9/1993  Bergum et al. ............................. 380/4
5,392,357  2/1995  Bulfer et al. ............................. 380/33
5,410,599  4/1995  Crowley et al. ............................. 380/9

Primary Examiner—Curtis Kuntz
Assistant Examiner—Nay A. Maung
Attorney, Agent, or Firm—Frank J. Bogacz

[57] ABSTRACT

A security module for use in a cellular telephone provides for low power consumption. The security module includes a vocoder processor for manipulating signals from the telephone's microphone and to the telephone's ear piece; an encryption engine; a modem processor for controlling transmitted and received data from the cellular telephone; and a security system controller. The processors consume virtually no power when the phone is in the standby mode and very little power to produce encrypted communication when the cellular phone is operational.

16 Claims, 2 Drawing Sheets

TELECOMMUNICATIONS SECURITY MODULE

BACKGROUND OF THE INVENTION

The present invention pertains to secure telecommunications and more particularly to security systems for cellular telecommunications.

The current Secure Telephone market has mainly involved operation over the public switched telephone network using analog phone lines. Currently secure telephone products are made up of many different technologies (Vocoder, modem, Signaling, and Encryption) and consume a fair amount of power.

With the wide spread use of portable communications, battery life is an important consideration. Any additional circuitry in a telecommunication terminal such as a cellular telephone significantly affects the battery life and hence the use of the telephone. Security for speech communications is highly desirable especially for radio telephones in which communications may be readily intercepted. Adding circuitry for security, however, affects the battery life of the radio telephone and hence the radio telephone's ability to be used to transmit and receive.

Battery life is a critical mission parameter for many U.S. government applications(i.e. covert, search and rescue, etc.) which are mandated with the use of secure communications. Commercial applications involving secure communications will have similar requirements which are fundamental to the ergonomics of the radio telephone (i.e. small size, portable, etc.).

Typical security modules for telecommunication terminals include accessory attachments which are placed in series with the device which is to be secured and the target communications medium. Prior art examples include security modules for plain old telephones, fax machines, and secure modems which have been identified in the commercial marketplace.

These typical security systems do not provide for portability and miniaturization. These problems are usually overcome by providing large batteries accompanied by a DC—DC converter to provide the proper power outputs. The packaging of these devices are usually put into a briefcase or a small portable carrying device.

SUMMARY OF THE INVENTION

A security module is used in a cellular telephone and provides for low power consumption. The security module includes a vocoder processor for manipulating signals from the telephone's microphone and to the telephone's ear piece, art encryption engine; a modem processor for controlling transmitted and received data from the cellular telephone; and a security system controller.

DESCRIPTION OF THE PREFERRED EMBODIMENT

The telecommunications terminal security module may be accomplished by creating a low power architecture using: 3-volt technology, multi-function DSP (digital signal processor), programmable encryption, and a smart power controller to maintain the lowest power profile of the architecture.

The security module will provide digital encryption of the voice using voice compression, encryption, and modem technologies. The block diagram below shows the security module.

Figure 1:
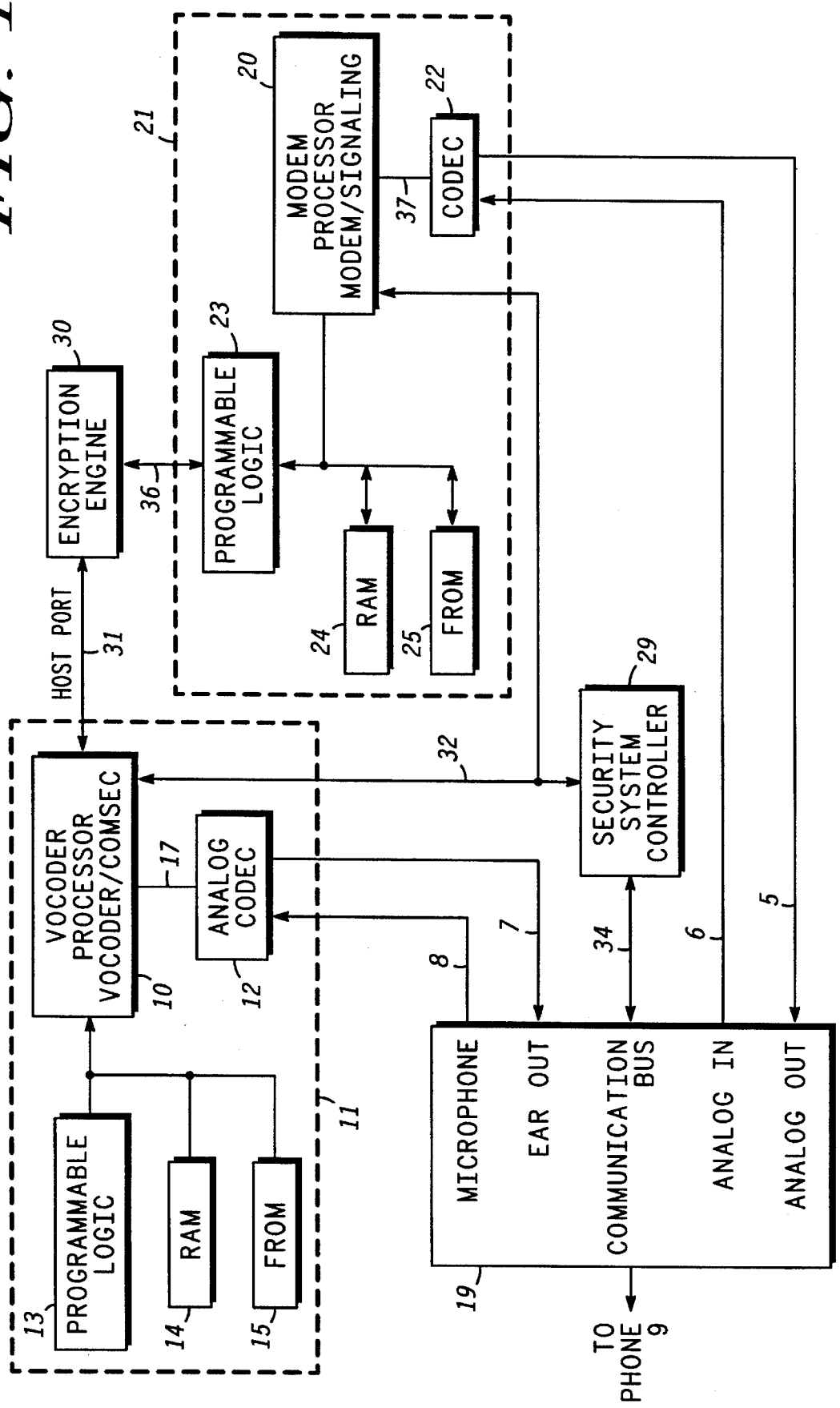
FIG. 1 is a block diagram of a telecommunications security module in accordance with the present invention.

Referring to FIG. 1 a block diagram of a security module for a portable telephone in accordance with a preferred embodiment of the invention. The security module consists of four main subsystems: a Vocoder/Comsec subsystem processor 11, an encryption engine 30, a Modem/Signaling subsystem processor 21, and a Security system controller 29. Any or all of these can be integrated into a single large scale integration circuit.

Vocoder processor 10 is coupled to programmable logic 13, RAM 14, and flash ROM 15 and to analog codec 12. Vocoder processor 10 is further coupled to encryption engine 30.

Modem processor 20 is coupled to modem logic 23, RAM 24, flash ROM 25, codec 22, and to encryption engine 30. Modem processor 20 is further coupled to security system controller 29.

The microphone (Mic) of telephone 9 and ear piece out (Ear Out) are coupled to analog codec 12. Security system controller 29 is coupled to the communication bus of cellular phone 9 for the normal transmission and reception of data by the cellular phone. Analog in and analog out of cellular phone 9 are coupled to codec 22.

The Vocoder/Comsec subsystem 11 is used for the compression/de-compression of voice signals and performs some of the overall security functions. It includes a digital signal processor 10, memory Flash Read Only Memory (FROM) 15 and Random Access Memory (RAM) 14, programmable logic 13, and an Analog Codec 12 which performs A/D (analog to digital) & D/A (digital to analog) conversions. The Vocoder processor 10 uses the Flash read only memory 15 and Random access memory 14 to perform the voice compression and decompression computations and passes the communication security (Comsec) messages over to encryption engine 30. All of the programs are downloaded from FROM 15 and run out of RAM 14. The programmable logic 13 performs the memory decoding between the memory and the Vocoder processor 10. The programmable logic 13 will also allow for expansion of future capabilities. The host port 31 is a parallel port which is a communication path between the vocoder processor and the encryption engine.

The encryption engine 30 is used to perform the encryption and decryption on the compressed voice signals. It is a low power programmable logic circuit such as an ASIC (Application Specific Integrated Circuit) which is programmed with different software algorithms from the Vocoder processor 10 and its memory for encryption and decryption. The encryption engine communicates through two different paths: (1) to the communicate to the vocoder processor 10 (via host port 31) for encryption/decryption of compressed clear text voice signals; and (2) to communicate to the modem processor 20 (via the programmable logic 23) for sending/receiving encrypted compressed voice to/from the modem's data pump which is performed in software by modem processor 20.

The Modem/Signaling subsystem 21 performs the modulation/de-modulation of the encrypted compressed voice signals for transport over the analog channel. It includes a digital signal processor 20, memory (Flash Read Only Memory 25 and Random Access Memory 24), programmable logic 23, and an Analog Codec 22 (performs A/D & D/A). The Modem processor 20 uses the Flash read only memory 25 and Random access memory 24 to perform the modem computations and insert/remove signaling messages from the modem traffic. All programs are downloaded from FROM 25 and run out of RAM 24. The programmable logic 23 performs the memory decoding between the memory and the Modem processor 20. The programmable logic 23 will also perform some of the modem's phase lock loop function. The programmable logic helps lower parts count and overall power.

Security system controller 29 is a single chip micro controller such as a 68HC11 which is used for monitoring and controlling the modes of the security module. It monitors two buses: (1) the external communications bus 34 located in the portable radio telephone; and (2) internal communications bus 32 to determine the state of security module and when to conserve power.

Programmable logic units 13 and 23 may be implemented with an XC series programmable logic unit manufactured by Xilinx or equivalents, or equivalent gate array or collection of small scale logic components. Codecs 12 and 22 may comprise a codec unit TLC320AC01 as manufactured by the Texas Instruments corporation or equivalents. Processor 10 and 20 may be implemented with a Motorola 56002 digital signal procesor (DSP) or equivalent. The flash read only memory can also be substituted by EEROM, ROM, or equivalents. Encryption engine 30 is a Motorola gate array which may execute following algorithms: type (1) government classified; type (2) goverment contractors/police such as Skipjack or Clipper, type (3) commercial may be DES (data encryption standard); and type (4) International may be DVI (Motorola proprietary) or other proprietary algorithms.

EXAMPLE OF OPERATION

The security system controller 29 will hold both processor subsystems (11 and 21) in an idle mode until the security system controller detects the proper command sequence on communications bus 34.

Once the proper sequence is detected then the subsystems will be powered up and setup a secure channel with the far end unit, the remote device which communicates with the cellular phone. Once the secure channel has been established the voice signals from the microphone of the radio telephone will be processed.

Voice signals from the radio telephone's microphone are received on connector 19. The mic signal 8 will be routed to the Codec 12 to be digitized. The digitized signal is routed into processor 10 through a high speed serial communications bus 17. The digitized voice information is compressed and routed through host interface bus 31 on to encryption engine 30 for encryption. The encrypted voice is passed on to processor 20 (via the serial communications interface 36) where it is modulated for transmission. The compressed, encrypted, and modulated voice is passed on to codec 22 (via serial communications interface 37) to be converted to analog signals for transmission to the cellular or portable telephone through the analog out signal 5 on connector 19.

Simultaneously, analog signals from the portable telephone (signals from the microphone in the far end unit) are received on the analog In 6 of connector 19 and routed to codec 22 where they are digitized and passed on to processor 20 (via serial communications interface 37). These signals are demodulated and routed on to encryption engine 30 (via serial communications interface 36) to be decrypted. The decrypted and compressed voice information is then passed on from the encryption engine to processor 10 (through host interface bus 31) to be decompressed (synthesized). The decompressed digitized voice is routed on to analog codec 12 (via serial interface 17) for conversion back to an analog voice signal. The analog voice signal is sent from analog codec 12 out to connector 19 (via the ear out 7 signal) for routing to the ear piece of the radio telephone.

Figure 2:
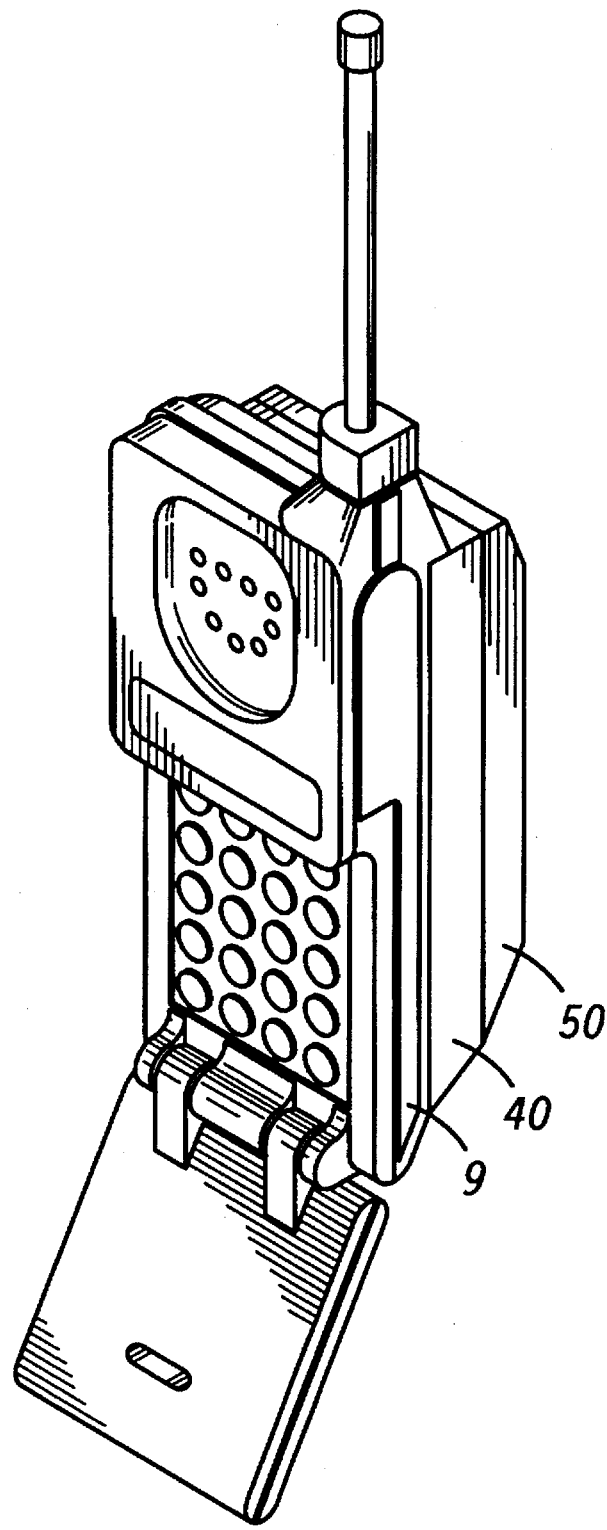
FIG. 2 illustrates an isometric view of a security module and telephone, in accordance with the preferred embodiment of the invention.

Referring to FIG. 2 an isometric diagram of a secure low power cellular telephone 45 in accordance with the present invention is shown. The security module 40 is attached to the cellular radio telephone 9 between the battery pack 50 and the cellular phone 9. This will allow the security module to draw from the battery and use the internal communications bus of the cellular radio telephone 9. A separate microphone and ear piece may be added externally to allow operation in either mode.

Secure cellular telephone 45 includes a cellular phone 9, security module 40, as described in FIG. 1, and a battery 50. The security module 40 is coupled between cellular phone 9 and battery 50.

The security module 40 connects to a cellular or portable radio telephone 9 through a connector interface (not shown) which includes: microphone and earphone signals for the handset interface, analog In/Out leads (5,6) for the radio telephone's transceiver interface, and a communications bus interface (34) for monitoring the radio phone.

The security module for a telecommunications terminal is an important advance in the art since it provides a way to protect sensitive and classified information from being intercepted over the air waves. As more and more products begin to use wireless technologies to communicate, the need for security modules will increase as the awareness of the user increases. Further the configuration shown herein meets the needs of the industry in that it supplies a low power security unit for cellular or portable phones which will not adversely affect the battery life of such phones.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A telephone security module comprising: a first processor which provides for compressing and decompressing digital voice data;

an encryption engine for encrypting and decrypting said compressed and decompressed digital voice data, said encryption engine coupled to said first processor;

a second processor for converting encrypted digital compressed voice data to encrypted analog compressed voice data and for converting encrypted analog compressed voice data to encrypted digital compressed voice data, said second processor coupled to said encryption engine, said second processor includes logic means for controlling memory decoding and said logic means for providing a phase lock loop for said second processor; and a security system controller for transmitting status and receiving commands to control operation of said first and second processors.

2. A telephone security module as claimed in claim 1, wherein said first processor includes first processor means for controlling said compressing and decompressing of said digital voice data.

3. A telephone security module as claimed in claim 2, wherein said first processor further includes memory means for performing and storing the results of the compressing and decompressing of said digital voice data, said memory means coupled to said first processor means.

4. A telephone security module as claimed in claim 3, wherein said memory means includes:

read only memory means for storing operating instructions for execution by said first processor for compressing and decompressing of said digital voice data, said read only memory means coupled to said first processor means; and random access memory means for storing operating instructions for execution by said processor of said read only memory means and for storing intermediate computation results of said compressing and said decompressing, said random access memory means coupled to said first processor means and to said read only memory means.

5. A telephone security module as claimed in claim 4, wherein said first processor further includes logic means for controlling memory decoding between said read only memory means and said random access memory means and said processor means, said logic means coupled to said first processor means and to said random access means and to said read only memory means.

6. A telephone security module as claimed in claim 2, wherein said first processor means further includes analog codec means for converting analog voice data to said digital voice data and for converting said digital voice data to said analog voice data, said analog codec means coupled to said first processor means.

7. A telephone security module as claimed in claim 2, wherein there is further included a parallel port for coupling of said encryption engine with said first processor means.

8. A telephone security module as claimed in claim 1, wherein said second processor includes second processor means for controlling conversion of said encrypted compressed digital voice data to encrypted compressed analog voice data and for controlling conversion of said encrypted compressed analog voice data to said encrypted compressed digital voice data, said second processor means coupled to said encryption engine.

9. A telephone security module as claimed in claim 8, wherein said second processor further includes memory means for performing and storing the results of said conversions, said memory means coupled to said second processor means.

10. A telephone security module as claimed in claim 9, wherein said memory means includes:

read only memory means for storing operating instructions for said conversions, said read only memory means coupled to said second processor means; and random access memory means for storing operating instructions for execution by said second processor of said read only memory means and for storing intermediate computation results of said conversions, said random access memory means coupled to said second processor means.

11. A telephone security module as claimed in claim 10, wherein said logic means controls memory decoding between said read only memory and said random access memory and said second processor means, said logic means coupled to said second processor means and to said random access means and to said read only memory means.

12. A telephone security module as claimed in claim 8, wherein said second processor further includes codec means for converting said encrypted compressed analog voice data to encrypted compressed digital voice data and for converting encrypted compressed digital voice data to encrypted compressed analog voice data, said codec coupled to said second processor means.

13. A telephone security module as claimed in claim 8, wherein said security system controller is coupled to said second processor means.

14. A telephone security module as claimed in claim 2, wherein said security system controller is coupled to said second processor means.

15. A telephone security module comprising:

a cellular telephone including:

a first processor which provides for compressing and decompressing digital voice data;

an encryption engine for encrypting and decrypting said compressed and decompressed digital voice data, said encryption engine coupled to said first processor;

a second processor for converting encrypted compressed digital voice to encrypted compressed analog voice and for converting encrypted compressed analog voice to encrypted compressed digital voice, said second processor coupled to said encryption engine, said second processor includes logic means for controlling memory decoding and said logic means for providing a phase lock loop for said second processor; and a security system controller for transmitting status and receiving commands to control operation of said first and second processors.

16. A cellular telephone security module comprising:

a first processor which provides for compressing and decompressing digital voice data;

an encryption engine for encrypting and decrypting said compressed and decompressed digital voice data, said encryption engine coupled to said first processor;

a second processor for converting encrypted compressed digital voice to encrypted compressed analog voice and for converting encrypted compressed analog voice to encrypted compressed digital voice, said second processor coupled to said encryption engine, said second processor includes logic means for controlling memory decoding and said logic means for providing a phase lock loop for said second processor; and a security system controller for transmitting status and receiving commands to control operation of said first and second processors.

* * * * *